(12) United States Patent
Certain (10) Patent No.: US 6,698,181 B2
(45) Date of Patent: Mar. 2, 2004

(54) SYSTEM FOR REGULATING THE OUTPUT OF AN ENGINE OF A HELICOPTER

(75) Inventor: Bernard Certain, Aix en Provence (FR)

(73) Assignee: Eurocopter (FR)

( * ) Notice: Subject to any disclaimer, the term of this patent is extended or adjusted under 35 U.S.C. 154(b) by 2 days.

(21) Appl. No.: 10/194,313

(22) Filed: Jul. 15, 2002

(65) Prior Publication Data

US 2003/0051461 A1 Mar. 20, 2003

(30) Foreign Application Priority Data

Jul. 19, 2001 (FR) .......................................... 01 09644

(51) Int. Cl.$^7$ ............................................... F02C 9/28
(52) U.S. Cl. ................................. 60/39.161; 60/39.281
(58) Field of Search .................. 60/39.161, 39.281, 60/39.282; 244/17.13

(56) References Cited

U.S. PATENT DOCUMENTS

| | | | | |
|---|---|---|---|---|
| 3,969,890 A | * | 7/1976 | Nelson ..................... | 60/39.281 |
| 4,423,593 A | | 1/1984 | Zagranski et al. ....... | 60/39.161 |
| 4,998,202 A | * | 3/1991 | Walsh et al. ............. | 60/39.282 |
| 5,231,823 A | * | 8/1993 | Curran et al. ............ | 60/39.281 |
| 2002/0171005 A1 | * | 11/2002 | Claudet ................... | 244/17.13 |

FOREIGN PATENT DOCUMENTS

FR 2803051 6/2001

OTHER PUBLICATIONS

Preliminary Search Report dated Jun. 4, 2002.
Claveau et al., "Advanced Fuel Control System for Turboshaft Engines", Annual Forum of the American Helicopter Society, vol. 2, pggs. 1644–1651, Jun. 1996.

* cited by examiner

*Primary Examiner*—Louis J. Casaregola
(74) *Attorney, Agent, or Firm*—Stevens, Davis, Miller & Mosher, LLP (57) ABSTRACT

The regulating system (1) comprises in particular a metering valve (4) for metering the fuel fed to the engine (2), as a function of control commands, a device (8) for determining a pre-set value NTLcons corresponding to the pre-set value of the rotational output of the free turbine of the engine (2), and computation means (9, 10) which compute control commands making it possible to slave the output of the gas generator of the engine (2) to a pre-set value NGcons of the output of the gas generator, which depends on the rotational output NTL of the free turbine and said pre-set value NTLcons. Said device (8) comprises a means (21) for determining the position of a rudder bar of said helicopter, and an auxiliary computation means (22) which computes the pre-set value NTLcons as a function of said position of the rudder bar and of other external parameters, in particular the altitude.

11 Claims, 3 Drawing Sheets

SYSTEM FOR REGULATING THE OUTPUT OF AN ENGINE OF A HELICOPTER

BACKGROUND OF THE INVENTION

The present invention relates to a system for regulating the output of at least one engine of a helicopter.

DESCRIPTION OF THE PRIOR ART

It is known that the control system of an engine oversees the quantity of fuel which is injected into the combustion chamber of this engine, in the following various operating configurations of the helicopter: startup, flight, engine switch-off. For this purpose, two mechanical controls act on the engine, namely:

- a flow rate control which is actuated by the pilot (flow rate lever); and
- a control for compensating the regulation of the engine. The latter control, which is coupled to the collective pitch control, is automatic.

The pilot is therefore furnished only with a single direct control, the flow rate lever, which in fact serves only during the switch-on, switch-off phases and during the acceleration of the engine up to the regulated output (flow rate lever in the "flight" position). In helicopters equipped with an engine computer, these phases are overseen automatically by the computer: the flow rate lever then becomes unnecessary.

When the flow rate lever is set to the "flight" position, the pilot no longer needs to control the flow rate, since the engine is then governed by a regulating system which automatically meters the fuel as a function of the power demanded by the rotor (function of the collective pitch) and keeps the speed of rotation of the free turbine of the engine constant. The control of the regulation acts on the free turbine regulator. Intervening automatically on variation of the collective pitch, it:

- compensates partially for the droop of the centrifugal regulator, that is to say preserves a substantially constant NR rotor output regardless of the fuel flow rate, hence regardless of the power demanded; and
- affords a very short response time, avoiding pumping during abrupt accelerations and shutdown during abrupt decelerations. For this reason, this control is also referred to as "anticipator", since it antedates the normal reaction of the centrifugal regulator.

To do this, the system for regulating the output of the engine comprises, in a known manner:

- at least one metering valve for metering said fuel fed to the engine, as a function of control commands;
- a means for measuring an NTL output corresponding to the rotational output of the free turbine of said engine;
- a means for measuring an NG output corresponding to the output of the gas generator of said engine;
- a device for determining a pre-set value NTLcons corresponding to the pre-set value of the rotational output of the free turbine of the engine. This device is generally an adjustable potentiometer which delivers a constant value. This value can be tuned, if necessary, by the pilot, to obtain values of the NR rotor output which are in accordance with the flight manual; and
- computation means for automatically computing the control commands which are applied to said metering valve. Said computation means compute control commands which make it possible to slave, knowing said measured NG output, the output of the gas generator of said engine to a pre-set value NGcons of said output of the gas generator, which depends on said measured NTL output and on said specified pre-set value NTLcons.

This known regulator system has certain drawbacks. In particular, the NR rotational output of the rotor in hovering flight is imposed by the prior choice of the optimal output for level flight and always remains less than the NR output for level flight.

SUMMARY OF THE INVENTION

The object of the present invention is to remedy these drawbacks and to enhance this regulating system with the aim of obtaining an output/speed curve which meets particular safety, noise and performance criteria, without modifying the basics of the regulating system.

To this end, according to the invention, said regulating system of the type comprising:

- at least one metering valve for metering said fuel fed to the engine, as a function of control commands;
- a first means for measuring an NTL output corresponding to the rotational output of the free turbine of said engine;
- a second means for measuring an NG output corresponding to the output of the gas generator of said engine;
- a device for determining a pre-set value NTLcons corresponding to the pre-set value of the rotational output of the free turbine of the engine; and
- computation means for automatically computing the control commands which are applied to said metering valve, said computation means computing control commands making it possible to slave, knowing said measured output, the output of the gas generator of said engine to a pre-set value NGcons of said output of the gas generator, which depends on said measured NTL output and on said specified pre-set value NTLcons, is noteworthy in that said device comprises at least:

- a third means for determining the position of a rudder bar of said helicopter; and
- an auxiliary computation means which computes said pre-set value NTLcons as a function of said position of the rudder bar.

Thus, by virtue of allowing for the position $D\delta$ of the rudder bar in the formulation of said pre-set value NTLcons of the rotational output of the free turbine, a particular and advantageous relation between the NR rotor output (the NTL and NR outputs being proportional, on account of the mechanical link existing between the engine and the main gearbox of the helicopter) and the speed Vi of the helicopter is obtained on account in particular of the variation in the position $D\delta$ as a function of the speed Vi of the helicopter, as will be seen in greater detail hereinbelow.

The rotor output regulation thus obtained, which therefore depends on the speed, has numerous advantages and makes it possible in particular:

- around the hovering flight, to increase the output to the maximum possible, so as:
  - to push back the weight limit onwards of which there is no longer any nonsafety zone should the engine fail (broadening of the height/speed chart); and
  - to increase the effectiveness of the tail rotor (the thrust of the tail rotor increasing with the rotational output);
- to limit the output in level flight, so as to reduce the flyover noise; and
- not to reduce the PMC (maximum continuous power) level output too much so as not to reduce the maximum speed too much, especially at low altitude.

Moreover, by virtue of the invention, the following advantages are also obtained:

at low weight, the power required for flight is lower, hence the rotor torque is also lower. This results in a smaller anti-torque requirement and hence a lower rudder bar control (Dδ), this bringing about a lower NR output since the NR output follows the variations of Dδ. Thus, the helicopter will be less noisy, since the output of its rotors will be lower (the output of the tail rotor being proportional to that of the main rotor); and when climbing at very low speed, when the vertical stabilizer is hardly effective, the rudder bar control (Dδ) must increase so as to compensate for the progressive decrease in the density of the air with altitude. This results in an increase in the NR output, thereby improving the efficiency of the rotor (less consumption for equal climb performance). Likewise, while the helicopter is climbing, the pilot increases the overall pitch of the main rotor so as to increase the lift and hence the power and the torque. The anti-torque requirement increases accordingly, thereby also producing an increase in the NR output favorable to performance.

Moreover, the present invention can be implemented in a simple manner and cheaply, simply by adding said auxiliary computation means and said third means for determining the position of the rudder bar. Preferably, this third means is a feedback potentiometer for copying the position (Dδ) of the rudder bar which, generally, already exists on a helicopter, to aid the automatic pilot. This facilitates the carrying out of the invention even more.

It will be noted that the present invention is applicable to any type of regulating system, be it electromechanical, hydromechanical or even digital, and is so equally for regulation of proportional type (which, as is known, formulates a pre-set value NGcons of the output of the gas generator of the engine, which is proportional to the discrepancy between said NTL output and said pre-set value NTLcons) and for regulation of integral type (whose pre-set value NGcons alters until the NTL output is equal to the pre-set value NTLcons).

In a preferred embodiment, said auxiliary computation means:

computes the following expression A(Dδ):

$$A(D\delta)=aD\delta+b$$

in which:

Dδ is the position of the rudder bar; and a and b are predetermined parameters which take constant values over successive intervals of values of Dδ; and uses this expression A(Dδ) to compute said pre-set value NTLcons.

Of course, within the framework of the present invention, this function A can take other forms and in particular all the other possible forms making it possible, for example, to meet particular requirements.

Moreover, advantageously, said device furthermore comprises at least one auxiliary means for determining the value of at least one auxiliary parameter, and said auxiliary computation means uses said value of the auxiliary parameter to compute said pre-set value NTLcons.

In this case, preferably, said auxiliary computation means uses, as auxiliary parameter, at least one of the following parameters:

the altitude of the helicopter;

the speed of the helicopter;

the ambient temperature; and a pre-set value delivered by an adjustable potentiometer.

The variation of the NR rotor output as a function of the helicopter speed Vi, obtained by virtue of the invention, is especially advantageous in hovering flight, as indicated previously. On the other hand, in the transient phase of flight, two problems may arise, namely:

a safety problem, should the engine fail at takeoff.

Starting from hovering flight, the pilot tilts the rotor forward (cyclic pitching control) so as to accelerate, at the same time as he acts on the rudder bar so as to counter the rotor torque and thus avoid undesirable rotation of the helicopter about its yaw axis (given that at low speed, the vertical stabilizer is ineffective) . As soon as the speed increases, the effectiveness of the stabilizer increases and it is necessary to reduce the action on the rudder bar. The NR output then decreases, since it is slaved to the rudder bar while the speed is still low. If the failure occurs at this moment, the pilot must carry out the tricky manoeuvre of landing with an output close to the minimum of the curve. Since moreover, the output of the rotor decreases very rapidly upon failure (around 50 rpm) whatever the pilot does, the helicopter may rapidly find itself in a very difficult situation through lack of lift; and a flight quality problem.

With the introduction of the rudder bar position information into the engine regulation, the yawing manoeuvres bring about variations in the NR output. However, these variations are undesirable. Specifically, when the pilot acts on the rudder bar so as to counter a gust of wind or perform a rapid rotation, the NR output must not vary, lest it cause nuisance vertical movements of the helicopter.

To remedy at least these two problems, advantageously, said auxiliary computation means carries out a filtering of the value of the position Dδ of the rudder bar, with a transfer function $$\frac{1}{1+\tau 1 p},$$

τ1 being a predetermined parameter, before using this filtered value to compute said pre-set value NTLcons.

Thus, by virtue of this filtering, the effect of the position Dδ of the rudder bar on the variations in the NR rotor output is also filtered, this having the consequence:

of delaying the reduction in the NR output when depressing the foot pedal (Dδ) on takeoff, to ensure safety near the ground, this making it possible to remedy the abovementioned safety problem; and of delaying and attenuating the effectiveness of the position Dδ within the regulation so as to ensure proper behavior during yawing manoeuvres, which are of short duration, thereby making it possible to remedy the abovementioned flight quality problem.

Moreover, in view of the couplings between the position Dδ and the NR output, on the one hand, and the NR and NG outputs, on the other hand, the rudder bar movements (Dδ) have an impact on the NR output, and hence on the torque delivered by the engine. The torque variations induced by the controls of the rudder bar might be too abrupt in certain flight configurations and might be detrimental, in particular, to the mechanical and structural assemblies.

To avoid such a problem, advantageously, said auxiliary computation means carries out a filtering of the derivative $$\frac{d}{dt}(D\delta)$$

of the Dδ of the rudder bar, with a transfer function $$\frac{kp}{1+\tau 2p},$$

k and τ2 being predetermined parameters, before using this filtered value to compute said pre-set value NTLcons.

By virtue of this last filtering, the response of the helicopter to a movement of the rudder bar is improved. This is especially beneficial in respect of flight configurations where the engine is close to a limit of power, torque or NG output, since it avoids limitation overshoots during manoeuvres.

Moreover, in a preferred embodiment, said computation means and said auxiliary computation means are grouped together within a single computer, preferably of the FADEC ("Full Authority Digital Engine Computer") type. The introduction, in the form of electrical signals, of the various parameters and in particular of the position Dδ, and the carrying out of the various computation functions are thus rendered especially easy.

BRIEF DESCRIPTION OF THE DRAWINGS

The figures of the appended drawing will elucidate the manner in which the invention may be embodied. In these figures, identical references denote similar elements.

DESCRIPTION OF THE PREFERRED EMBODIMENTS

Figure 1:
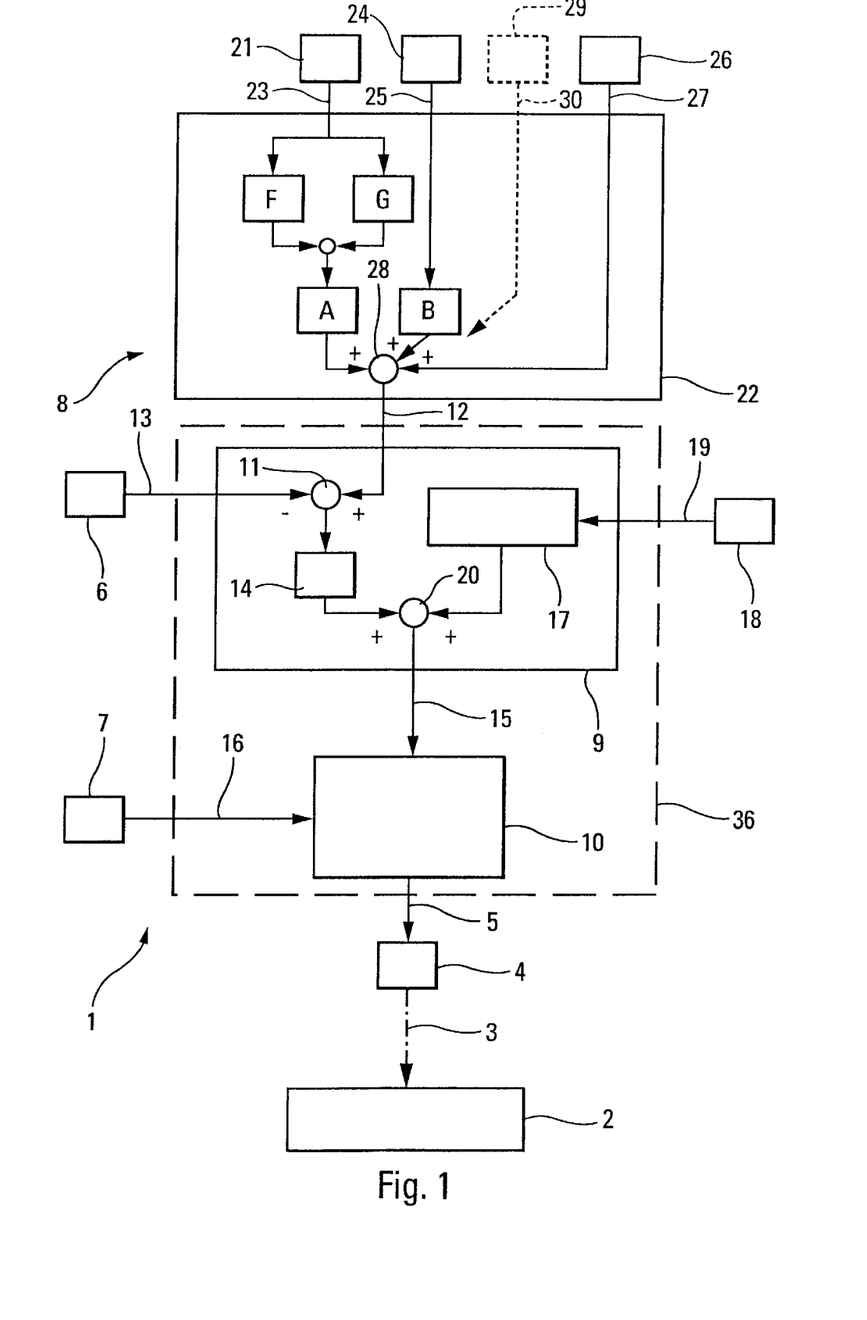
FIG. 1 is the schematic diagram of a regulating system in accordance with the invention.

The system 1 in accordance with the invention and represented diagrammatically in FIG. 1 is intended to regulate the output of at least one engine 2 of a helicopter (single-engine or multi-engine) and hence to regulate the output of the main forward propulsion and lift rotor of this helicopter, which is driven by this engine 2.

It is known that such a regulating system 1 is intended for automatically metering the fuel which is fed to the engine 2, as illustrated by a dashed link 3 in FIG. 1, and which intervenes in particular when the flow rate control (flow rate lever) (not represented) is brought by the pilot to a "flight" position.

In a known manner, said regulating system 1 comprises, as represented in FIG. 1:

- at least one metering valve 4, of standard type, for metering said fuel fed to the engine 2, as a function of control commands received via a link 5;
- a first means 6, of standard type, for measuring an NTL output corresponding to the rotational output of the free turbine of said engine 2;
- second means 7, of standard type, for measuring an NG output corresponding to the output of the gas generator of said engine 2;
- a device 8 for determining a pre-set value NTLcons corresponding to the pre-set value of the rotational output of the free turbine of the engine 2; and
- computation means 9 and 10 for automatically computing the control commands which are applied to said metering valve 4.

Said computation means 9 and 10 compute control commands making it possible to slave, knowing said measured NG output, the output of the gas generator of said engine to a pre-set value NGcons of said output of the gas generator, which depends on said measured NTL output and on said specified pre-set value NTLcons.

For this purpose:

- said computation means 9 determines said pre-set value NGcons of the output of the gas generator of the engine. To do this, in the embodiment of FIG. 1, it comprises in particular a differentiator 11 which computes the difference between the pre-set value NTLcons received via a link 12 of the device 8 and the NTL output received via a link 13 of the measurement means 6, as well as a multiplier 14 which multiplies this difference by a predetermined parameter Kp; and
- said computation means 10 determines the control commands of the metering valve 4, on the basis of the pre-set value NGcons received from the computation means 9 via a link 15 and of the NG output received via a link 16 from the measurement means 7.

Moreover, to improve the response time, said computation means 9 also comprises a computation element 17 which implements a known anticipation law C, using the value Dθ of the collective pitch, measured by a means 18 of standard type and received via a link 19. A summator 20 adds the results [C(Dθ)] emanating from the processing implemented by this computation element 17 to the results emanating from the multiplier 14.

To enhance this regulating system 1, according to the invention, said device 8 comprises at least:

- a third means 21 for determining the position Dδ of a rudder bar (not represented) of said helicopter; and
- an auxiliary computation means 22 specified hereinbelow which computes said pre-set value NTLcons (which is transmitted to the computation means 9 via the link 12) as a function of said position Dδ of the rudder bar (not represented).

Figure 2:
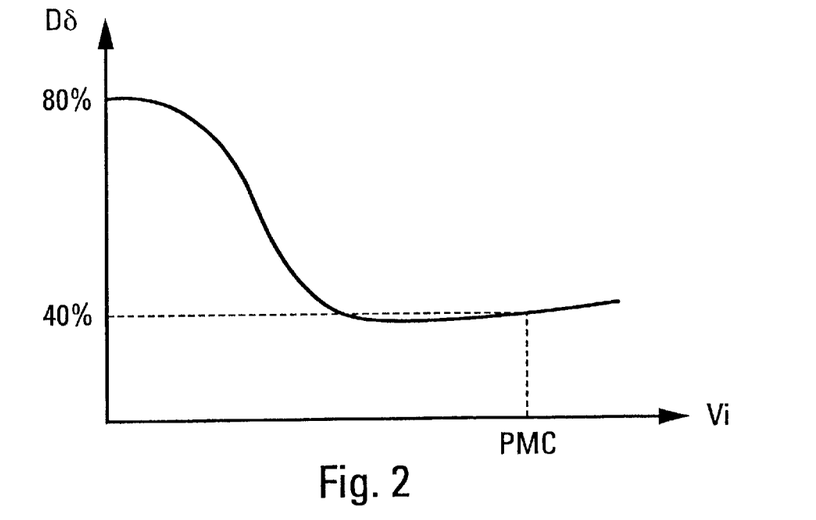
FIGS. 2 and 3 illustrate graphs clearly highlighting the effects obtained by virtue of the invention on the regulation of the output.
Figure 3:
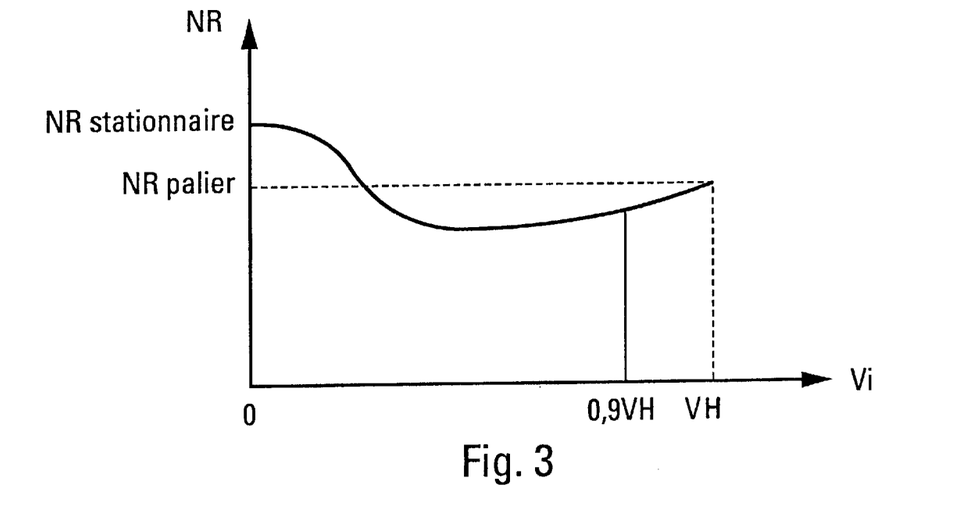

Thus, by virtue of allowance for the position Dδ of the rudder bar in the formulation of the pre-set value NTLcons of the rotational output of the free turbine, a particular and advantageous relation [NR=f2(Vi)] between the NR rotor output of the main forward propulsion and lift rotor of the helicopter and the speed Vi of the helicopter, and which is represented in FIG. 3, is obtained on account in particular of the variation [Dδ=f1(Vi)] in the position Dδ as a function of the speed Vi of the helicopter and which is represented in FIG. 2 where "PMC" represents the "maximum continuous power".

In this FIG. 3:
- "hovering NR" represents the rotor output in hovering flight;
- "level NR" represents the rotor output in level flight; and
- "VH" represents the maximum speed of the helicopter, corresponding to the PMC.

By virtue of this particular relation [NR=f2 (Vi)], the regulation of the rotor output R (dependent on the speed Vi) obtained thus exhibits numerous advantages and makes it possible in particular:

- around the hovering flight, to increase the output to the maximum possible, so as:

to push back the weight limit onwards of which there is no longer any nonsafety zone should the engine fail (broadening of the height/speed chart); and to increase the effectiveness of the tail rotor (the thrust of the tail rotor increasing with the rotational output);

to limit the output in level flight, so as to reduce the flyover noise; and not to reduce the PMC level output too much so as not to reduce the maximum speed too much, especially at low altitude.

Moreover, the present invention can be implemented in a simple manner and cheaply, simply by adding said auxiliary computation means 22 and said third means 21 for determining the position of the rudder bar.

In a preferred embodiment, this third means 21 is a feedback potentiometer for copying the position of the rudder bar which, generally, already exists on a helicopter and is associated with the automatic pilot. In this case, only the auxiliary computation means 22 needs to be specially provided, in a basic embodiment.

It will be noted that the present invention is applicable to any type of regulating system, be it electromechanical, hydromechanical or even digital, and is so equally for regulation of proportional type (which, as is known, formulates a pre-set value NGcons of the output of the gas generator of the engine 2, which is proportional to the discrepancy between said NTL output and said pre-set value NTLcons) and for regulation of integral type (whose pre-set value NGcons alters until the NTL output is equal to the pre-set value NTLcons).

According to the invention, the position D$\delta$ measured by the means 21 and transmitted via a link 23 is subjected, possibly after filtering (F and G) as specified hereinbelow, to a law A so as to obtain a curve A(D$\delta$).

Figure 4:
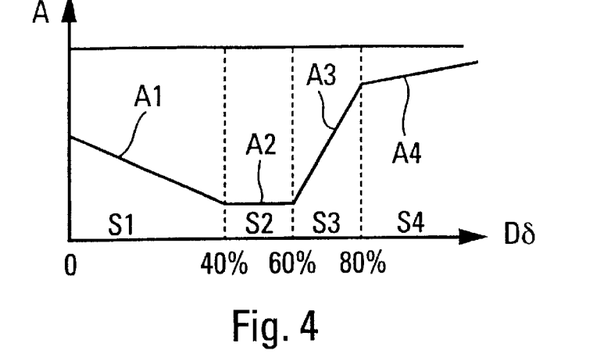
FIG. 4 is a graph illustrating a particular law of change taking into account the position of the rudder bar of the helicopter.

In a preferred embodiment, the curve A(D$\delta$) is a succession of straight line segments A1 to A4 and satisfies the relation A(D$\delta$)=a D$\delta$+b, in which a and b are predetermined constants which vary over sectors S1 to S4, from sector to sector.

In the embodiment represented in FIG. 4:

sector S1 lies between 0 and 40% of D$\delta$;

sector S2 lies between 40% and 60% of D$\delta$;

sector S3 lies between 60% and 80% of D$\delta$; and sector S4 is defined beyond 80% of D$\delta$.

Furthermore, in a particular embodiment:

the computation element 17 of the computation means 9 (intended for computing the pre-set value NGcons) computes the following expression A0 (D$\delta$):

$$A0(D\delta) = \frac{1}{Kp}[aD\delta + b]$$

in which:

D$\delta$ is the position of the rudder bar;

Kp is a predetermined coefficient used in the multiplier 14; and a and b are predetermined parameters which take constant values over successive intervals of values of D$\delta$; and said computation means 9 uses this expression A0 (D$\delta$) to compute said pre-set value NGcons.

In the particular embodiment of FIG. 1, the device 8 furthermore comprises:

a means 24, of standard type, for measuring the altitude Zp of the helicopter. This value is transmitted via a link 25 to the auxiliary computation means 22 which subjects it to a law B. It will be noted that the law B (Zp) can be used to translate the curve of FIG. 4 upward as the altitude increases; and a means 26 for generating a constant value "TrimNTL-cons" of the pre-set value of the NTL output, which is transmitted to the auxiliary computation means 22 via a link 27. Preferably, this means 26 corresponds to a potentiometer which can be adjusted by the pilot.

Furthermore, the auxiliary computation means 22 also comprises a summator 28 for making it possible to take all the abovementioned parameters into account simultaneously.

In this case, the pre-set value NLTcons satisfies the following relation:

$$NTLcons=A(D\delta)+B(Zp)+TrimNTLcons.$$

Other parameters may of course also be used for the computation of NTLcons, in particular the speed Vi of the helicopter and the ambient temperature. These parameters may be measured or determined by optional means 29 connected by a link 30 to the auxiliary computation means 22. The introduction of these additional parameters requires a mechanical or electrical interface (depending on whether the regulation is electromechanical, hydromechanical, analogue or digital). The additional laws can be effected within the auxiliary computation means 22 or else be effected via external interfaces.

From the foregoing, it may be deduced that the pre-set value NGcons computed by the computation means 9 may be written, in the case of "proportional regulation":

$$NGcons=C(D\theta)+Kp[NTLcons-NTL] \quad (1)$$

Since the output NG must be slaved to this pre-set value NGcons, we have:

$$NG=C(D\theta)+Kp[NTLcons-NTL] \quad (2)$$

NTLcons depending in particular on D$\delta$, on Vi and on Zp [NTLcons=f3(D$\delta$, Vi, Zp)], and C(D$\theta$) depending on D$\theta$[C (D$\theta$)=f4 (D$\theta$) ], we have moreover:

$$NG=f5(D\theta, D\delta, Vi, Zp)-KpNTL \quad (3)$$

Since moreover NTL and NR (rotor output) are proportional, the engine 2 and the main gearbox of the helicopter are mechanically linked, and the expression (3) may be written:

$$NG=f5 (D\theta, D\delta, Vi, Zp)-Kp1NR.$$

In view of the curves profiling the power required for flight and the collective pitch as a function of forward speed, a curve NR=f2(Vi) whose shape corresponds to the abovementioned requirement is obtained. In particular, the output when hovering is greater than when level.

With a judicious choice of the function f5(D$\theta$, Zp, Vi, D$\delta$), it is possible to tune this curve [NR=f2(Vi)] so as to make it pass through appropriate characteristic points.

This law of change meets the abovementioned requirements and has, moreover, additional advantages, namely:

at low weight, the power required for flight is lower, hence the rotor torque is also lower. This results in a smaller anti-torque requirement and hence a lower rudder bar control D$\delta$, this bringing about a lower NR output since the NR output follows the variations of D$\delta$ [the curve NR=f2(Vi) has the same shape as the curve D$\delta$=f1(Vi)]. Consequently, at low weight, the helicopter will be less noisy, since the output of its rotors will be lower (the output of the tail rotor being proportional to that of the main rotor); and when climbing at very low speed, when the vertical stabilizer is hardly effective, the rudder bar control Dδ must increase so as to compensate for the progressive decrease in the density of the air with altitude. This results in an increase in the NR output, thereby improving the efficiency of the rotor (less consumption for equal climb performance). Likewise, while the helicopter is climbing, the pilot increases the overall pitch of the main rotor so as to increase the lift and hence the power and the torque. The anti-torque requirement increases accordingly, thereby also producing an increase in the NR output favorable to performance.

It will be noted that, in the case of "integral regulation", the solution is the same. By introducing the parameter Dδ into the formulation of the pre-set NTLcons, an output NR which follows the same profile as its pre-set (principle of integral regulation), that is to say a curve of the same shape as the curve represented in FIG. 3, is obtained.

The variation of the NR rotor output as a function of the helicopter speed Vi, obtained by virtue of the invention, is especially advantageous in hovering flight, as indicated previously. On the other hand, in the transient phase of flight, two problems may arise, namely:

a safety problem, should the engine fail at take off.

Starting from hovering flight, the pilot tilts the rotor forward (cyclic pitching control) so as to accelerate, at the same time as he acts on the rudder bar so as to counter the rotor torque and thus avoid undesirable rotation of the helicopter about its yaw axis (given that at low speed, the vertical stabilizer is ineffective). As soon as the speed increases, the effectiveness of the stabilizer increases and it is necessary to reduce the action on the rudder bar. The NR output then decreases, since it is slaved to the rudder bar while the speed is still low. If the failure occurs at this moment, the pilot must carry out the tricky manoeuvre of landing with an output close to the minimum of the curve. Since moreover, the rotor loses revolutions very rapidly upon failure whatever the pilot does, the helicopter may rapidly find itself in a very difficult situation through lack of lift; and a flight quality problem. With the introduction of the rudder bar position Dδ information into the engine regulation, the yawing manoeuvres bring about variations in the NR output. However, these variations are undesirable. Specifically, when the pilot acts on the rudder bar so as to counter a gust of wind or perform a rapid rotation, the NR output must not vary, lest it cause nuisance vertical movements of the helicopter.

To remedy these problems, advantageously, said auxiliary computation means 22 carries out a filtering F of the value of the position Dδ of the rudder bar, with a transfer function $$\frac{1}{1+\tau 1 p},$$

τ1 being a predetermined parameter, before using this filtered value to compute said pre-set value NTLcons.

By virtue of this $1^{st}$-order filtering, in the formulation of the pre-set NTLcons, the term relating to Dδ will comprise an element of the form:

$$F(D\delta) = \frac{1}{1+\tau 1 p} D\delta$$

It makes it possible to delay the full effectiveness of the rudder bar while avoiding the discontinuities of the engine response. An experimental approach during flight makes it possible to determine the optimal value of this delay τ1 (6 s for example). This value can be approximated beforehand by simulation.

Thus, by virtue of this filtering F, the effect of the position Dδ on the variations in the NR rotor output is also filtered, this having the consequence:

of delaying the reduction in the NR output when depressing the foot pedal (Dδ), to ensure safety near the ground, this making it possible to remedy the abovementioned safety problem; and of delaying and attenuating the effectiveness of the position Dδ within the regulation so as to ensure proper behavior during yawing manoeuvres, which are of short duration, thereby making it possible to remedy the abovementioned flight quality problem.

Figure 5:
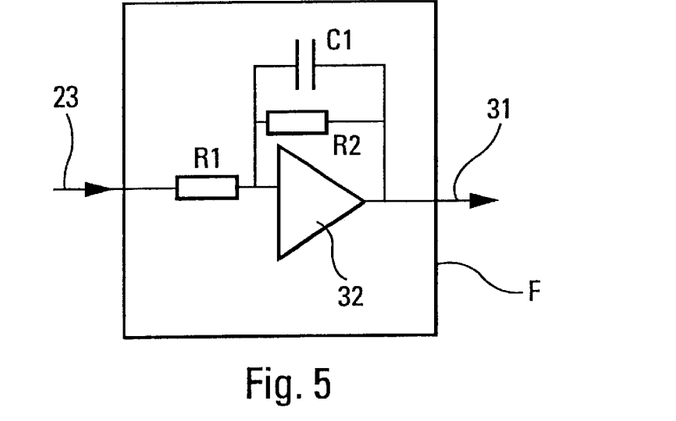
FIGS. 5 and 6 diagrammatically illustrate particular embodiments of filters which can be used in the implementation of the present invention.

In a particular embodiment, the filter F which is connected to links 23 and 31 can comprise the usual arrangement represented in FIG. 5, which comprises an operational amplifier 32, a capacitor C1 and resistors R1 and R2 (or any equivalent means). For this filter F, the transfer function equals:

$$\frac{R2}{R1}\left(\frac{1}{1+R2C1p}\right)$$

Moreover, in view of the couplings between the position Dδ and the NR output, on the one hand, and the NR and NG outputs, on the other hand, the rudder bar movements (Dδ) have an impact on the NR output, and hence on the torque delivered by the engine 2. The torque variations induced by the controls of the rudder bar might be too abrupt in certain flight configurations and might be detrimental, in particular, to the mechanical and structural assemblies.

In order to take the variations of Dδ into account, it is necessary to introduce into the formulation of the pre-set NTLcons a term proportional to $$\frac{d}{dt}(D\delta)$$

of negative sign, which is filtered sufficiently to eliminate the noise. With a $1^{st}$-order filtering G comparable to that of the abovementioned filter F, this term will be of the form:

$$G(D\delta) = k\frac{p}{1+\tau 2 p}D\delta$$

with a gain k and a constant τ2 which are adapted so as to keep the torque constant during the manoeuvre.

Just as for the above filter F, the suitable values of the parameters k and τ2 are determined by in-flight trials (they may be estimated beforehand via a theoretical approach).

Consequently, according to the invention, said auxiliary computation means 22 carries out a filtering G of the value of the position Dδ of the rudder bar, with a transfer function $$\frac{kp}{1+\tau 2p},$$

before using this filtered value to compute said pre-set value NTLcons.

By virtue of this filtering G, the response of the aircraft to a movement of the rudder bar is improved. This is especially beneficial in respect of flight configurations where the engine is close to a limit of power, torque or NG output, since it avoids limitation overshoots during manoeuvres.

Figure 6:
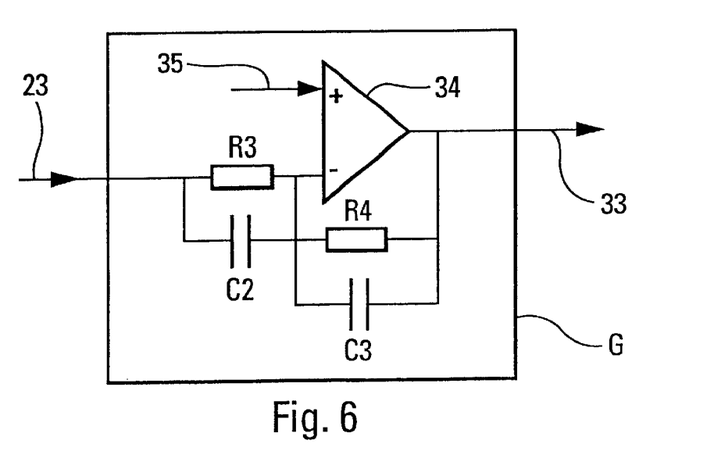

In a particular embodiment, the filter G which is connected to links 23 and 33 can comprise the standard arrangement represented in FIG. 6, which comprises an operational amplifier 34, whose non-inverting input 35 can be connected to a means (not represented) for measuring a particular parameter relating to the rotor output NR, capacitors C2 and C3 and resistors R3 and R4 (or any equivalent means).

For this filter G, the transfer function equals:

$$\frac{R4}{R3}\left(\frac{1+R3C2p}{1+R4C3p}\right)$$

Moreover, in a preferred embodiment [as represented partially in respect of the computation means 9 (NTL regulator) and the computation means 10 (NG regulator) which are grouped together into a unit 36 in FIG. 1], said computation means 9 and 10 and said auxiliary computation means 22 are grouped together within a single computer, preferably of the FADEC ("Full Authority Digital Engine Computer") type. The introduction, in the form of electrical signals, of the various parameters and in particular of the position Dδ, and the carrying out of the various computation functions are thus rendered especially easy.

What is claimed is:

1. A system for regulating the output of at least one engine of a helicopter, said regulating system being able to automatically meter the fuel fed to said engine and comprising:
    at least one metering valve for metering said fuel fed to the engine, as a function of control commands;
    a first means for measuring an NTL output corresponding to the rotational output of the free turbine of said engine;
    a second means for measuring an NG output corresponding to the output of the gas generator of said engine;
    a device for determining a pre-set value NTLcons corresponding to the pre-set value of the rotational output of the free turbine of the engine; and
    computation means for automatically computing the control commands which are applied to said metering valve, said computation means computing control commands making it possible to slave, knowing said measured NG output, the output of the gas generator of said engine to a pre-set value NGcons of said output of the gas generator, which depends on said measured NTL output and on said specified pre-set value NTLcons, wherein said device comprises at least:
    a third means for determining the position (Dδ) of a rudder bar of said helicopter; and
    an auxiliary computation means which computes said pre-set value NTLcons as a function of said position (Dδ) of the rudder bar.

2. The regulating system as claimed in claim 1, wherein said computation means compute the control commands so as to carry out regulation of proportional type.

3. The regulating system as claimed in claim 3, wherein said computation means compute the control commands so as to carry out regulation of integral type.

4. The regulating system as claimed in claim 1; wherein said third means is a feedback potentiometer for copying the position (Dδ) of the rudder bar.

5. The regulating system as claimed in claim 1, wherein said auxiliary computation means (22):
    computes the following expression A(Dδ):

$$A(D\delta)=aD\delta+b$$

in which:
    Dδ is the position of the rudder bar; and
    a and b are predetermined parameters which take constant values over successive intervals of values (S1, S2, S3, S4) of Dδ; and
    uses this expression A(Dδ) to compute said pre-set value NTLcons.

6. The regulating system as claimed in claim 1, wherein:
    a computation element of the computation means intended for computing the pre-set value NGcons computes the following expression A0 (Dδ):

$$A0(D\delta) = \frac{1}{Kp}[aD\delta + b]$$

in which:
    Dδ is the position of the rudder bar;
    Kp is a predetermined coefficient; and
    a and b are predetermined parameters which take constant values over successive intervals of values of Dδ; and
    said computation means uses this expression A0 (Dδ) to compute said pre-set value NGcons.

7. The regulating system as claimed in claim 1, wherein said device furthermore comprises at least one auxiliary means for determining the value of at least one auxiliary parameter, and wherein said auxiliary computation means uses said value of the auxiliary parameter to compute said pre-set value NTLcons.

8. The regulating system as claimed in claim 7, wherein said auxiliary computation means uses, as auxiliary parameter, at least one of the following parameters:
    the altitude of the helicopter;
    the speed of the helicopter;
    the ambient temperature; and
    a pre-set value delivered by an adjustable potentiometer.

9. The regulating system as claimed in claim 1, wherein said auxiliary computation means carries out a filtering (F) of the value of the position (Dδ) of the rudder bar, with a transfer function $$\frac{1}{1+\tau 1p},$$

τ1 being a predetermined parameter, before using this filtered value to compute said pre-set value NTLcons.

10. The regulating system as claimed in claim 1, wherein said auxiliary computation means carries out a filtering (G) of the derivative of the position (Dδ) of the rudder bar, with a transfer function $$\frac{kp}{1+\tau 2p},$$

k and τ2 being predetermined parameters, before using this filtered value to compute said pre-set value NTLcons.

11. The regulating system as claimed in claim 1, wherein said computation means and said auxiliary computation means are grouped together within a single computer.

* * * * *